(12) United States Patent
Holmes

(10) Patent No.: US 8,397,433 B2
(45) Date of Patent: Mar. 19, 2013

(54) REAR EDGE SIDE WINDOW CATCH ASSEMBLIES FOR VEHICLES

(75) Inventor: George William Holmes, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 502 days.

(21) Appl. No.: 12/341,441

(22) Filed: Dec. 22, 2008

(65) Prior Publication Data

US 2010/0154314 A1    Jun. 24, 2010

(51) Int. Cl.
B60J 5/04    (2006.01)

(52) U.S. Cl. ............ 49/502; 49/348; 49/349; 296/146.2; 296/187.12

(58) Field of Classification Search ............ 49/502, 49/348, 349, 440, 441; 292/288, DIG. 20; 296/146.2, 146.3, 146.16, 187.09, 187.1, 296/187.12; 16/86 B, 82
See application file for complete search history.

(56) References Cited

U.S. PATENT DOCUMENTS

| | | | | |
|---|---|---|---|---|
| 3,584,415 | A * | 6/1971 | Keefe et al. ............. | 49/348 |
| 4,306,381 | A * | 12/1981 | Presto ..................... | 49/502 |
| 4,418,498 | A * | 12/1983 | Wanlass et al. ......... | 49/425 |
| 4,603,894 | A | 8/1986 | Osenkowski | |
| 4,785,585 | A * | 11/1988 | Grier et al. ............. | 49/502 |
| 4,794,735 | A | 1/1989 | Batchelder et al. | |
| 4,934,101 | A * | 6/1990 | Hannya et al. ......... | 49/502 |
| 5,174,066 | A * | 12/1992 | Dupuy .................... | 49/502 |
| 5,404,677 | A * | 4/1995 | Umeda .................. | 49/502 |
| 5,417,470 | A | 5/1995 | Holt | |
| 5,560,152 | A * | 10/1996 | Haner ..................... | 49/348 |
| 5,647,171 | A * | 7/1997 | Wirsing et al. ........ | 49/502 |
| 5,802,770 | A * | 9/1998 | Kavanagh et al. ..... | 49/506 |
| 5,867,942 | A * | 2/1999 | Kowalski ............... | 49/502 |
| 5,907,897 | A * | 6/1999 | Hisano ................... | 29/434 |
| 5,927,020 | A * | 7/1999 | Kobrehel ............... | 49/502 |
| 5,953,809 | A * | 9/1999 | Kowalski ............... | 29/521 |
| 6,115,966 | A * | 9/2000 | Shibata .................. | 49/352 |
| 6,176,542 | B1 * | 1/2001 | Gooding et al. ....... | 296/146.6 |
| 6,299,235 | B1 * | 10/2001 | Davis et al. ............ | 296/146.16 |
| 6,301,835 | B1 * | 10/2001 | Pfeiffer et al. ......... | 49/502 |
| 6,481,162 | B2 * | 11/2002 | Lim ....................... | 49/374 |

(Continued)

FOREIGN PATENT DOCUMENTS

| | | |
|---|---|---|
| DE | 19511294 A1 | 10/1996 |
| JP | 53073726 A * | 6/1978 |

(Continued)

*Primary Examiner* — Katherine Mitchell
*Assistant Examiner* — Marcus Menezes
(74) *Attorney, Agent, or Firm* — Dinsmore & Shohl LLP

(57) ABSTRACT

A rear edge side window catch assembly for a vehicle side window may include a rear edge side window guide and a side window catch bracket. The rear edge side window guide may include an upper end, a lower end and a substantially U-shaped channel formed by an exterior side wall and an interior side wall connected by a back wall. The channel may extend substantially the entire length between the upper end and the lower end. The side window catch bracket may include a connection section and a catch section, wherein the connection section may connect to the rear edge side window guide and the catch section may extend from the rear edge side window guide along the exterior side wall in a direction towards an opening of the channel.

20 Claims, 3 Drawing Sheets

U.S. PATENT DOCUMENTS

| | | | |
|---|---|---|---|
| 6,604,325 B2* | 8/2003 | Nicolai et al. | 49/348 |
| 6,609,334 B1* | 8/2003 | Gutermuth | 49/375 |
| 6,729,674 B2* | 5/2004 | Davis et al. | 296/146.16 |
| 6,754,991 B2* | 6/2004 | Tokui et al. | 49/502 |
| 7,356,967 B2* | 4/2008 | Zwolinski et al. | 49/440 |
| 7,392,618 B2* | 7/2008 | Watanabe et al. | 49/428 |
| 7,523,585 B2* | 4/2009 | Butera et al. | 49/72 |
| 7,854,094 B2* | 12/2010 | Zimmer et al. | 49/440 |
| 2002/0069586 A1* | 6/2002 | Nicolai et al. | 49/375 |
| 2004/0003544 A1* | 1/2004 | Berry et al. | 49/374 |
| 2005/0139738 A1* | 6/2005 | Hwang et al. | 248/188.1 |
| 2006/0156632 A1* | 7/2006 | Ruppert et al. | 49/502 |
| 2007/0029835 A1 | 2/2007 | Herline et al. | |
| 2008/0224501 A1* | 9/2008 | Zimmer et al. | 296/201 |
| 2008/0289259 A1* | 11/2008 | Costigan et al. | 49/502 |

FOREIGN PATENT DOCUMENTS

| | | |
|---|---|---|
| JP | 4300714 A | 12/2008 |

* cited by examiner

REAR EDGE SIDE WINDOW CATCH ASSEMBLIES FOR VEHICLES

TECHNICAL FIELD

The present invention generally relates to side window guides for vehicles and, more specifically, side window guides for preventing a vehicle side window from striking a lock rod during a frontal crash.

BACKGROUND

Vehicle side door assemblies often house complex side door locking mechanisms and retractable side window systems. Often, a side door outside handle is operatively connected to a side door latch by a lock rod. The lock rod mechanically couples the side door outside handle to the side door latch mechanism thereby enabling the side door to be opened from the outside handle. Typically, lock rods are connected to lock mechanisms with a relatively loose connection. A retractable side window system may be positioned in the side door assembly adjacent the side door latch and lock rod and use front edge and rear edge side window guides to secure and guide the side window as it is raised and lowered. When the side window is fully lowered in the vehicle side door, the side window may rest in the guides which secure the side window and prevent unintentional interference with other side door components. The rear side window guide and lock rod may sit adjacent one another in a substantially vertical fashion such that when the side window is lowered, the rear edge of the side window is positioned in the rear edge side window guide proximate the lock rod.

In the event of a frontal impact collision, a car absorbs significant force that is propagated throughout the vehicle. For example, the impact may force the front wheel assembly back toward the body of a car causing collision and interference with the vehicle side door and assemblies housed therein. If the side window is lowered into the side door assembly, the significant force from the wheel assembly as it contacts the vehicle side door may cause the side window to become dislodged from the guides causing interference with the side door latch assembly. If the side window does not shatter, the intact side window may collide with the adjacent lock rod disrupting its connection and inhibiting its functionality. As a result of the dislodged lock rod, the side door outside handle becomes inoperable preventing the side door from being opened by the outside side door handle after the collision.

Accordingly, a need exists for alternative devices for preventing a dislodged side window from interfering with a lock rod.

SUMMARY

In one embodiment, a rear edge side window catch assembly for a vehicle side window may include a rear edge side window guide and a side window catch bracket. The rear edge side window guide may include an upper end, a lower end and a substantially U-shaped channel formed by an exterior side wall and an interior side wall connected by a back wall. The channel may extend substantially the entire length between the upper end and the lower end. The side window catch bracket may include a connection section and a catch section, wherein the connection section may connect to the rear edge side window guide and the catch section may extend from the rear edge side window guide along the exterior side wall in a direction towards an opening of the channel.

In another embodiment, a rear edge side window catch assembly for a vehicle side window may include a rear edge side window guide and a side window catch bracket. The rear edge side window guide may include a connector tab that may extend from an upper end, a connector bracket that may extend from a lower end and a substantially U-shaped channel formed by an exterior side wall and an interior side wall connected by a back wall. The channel may extend substantially the entire length between the connector tab and the connector bracket. The side window catch bracket may include a connection section and a catch section, wherein the connection section may connect to an outside surface of the back wall and the catch section may extend outward from the rear edge side window guide.

In yet another embodiment, a side window assembly for a vehicle side door may include a side window, a front edge side window guide, a rear edge side window guide and a side window catch bracket. The front edge side window guide may include a front edge side window channel with a rear-facing opening. The rear edge side window guide may include an exterior side wall and an interior side wall connected by a back wall forming a rear edge side window channel with a front-facing opening. The front-facing opening may substantially face the rear-facing opening and the side window may be disposed in the front edge side window channel and rear edge side window channel. The side window catch bracket may include a connection section connected to the rear edge side window guide and a catch section along the exterior side wall that may extend substantially toward the front edge side window guide.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 5:
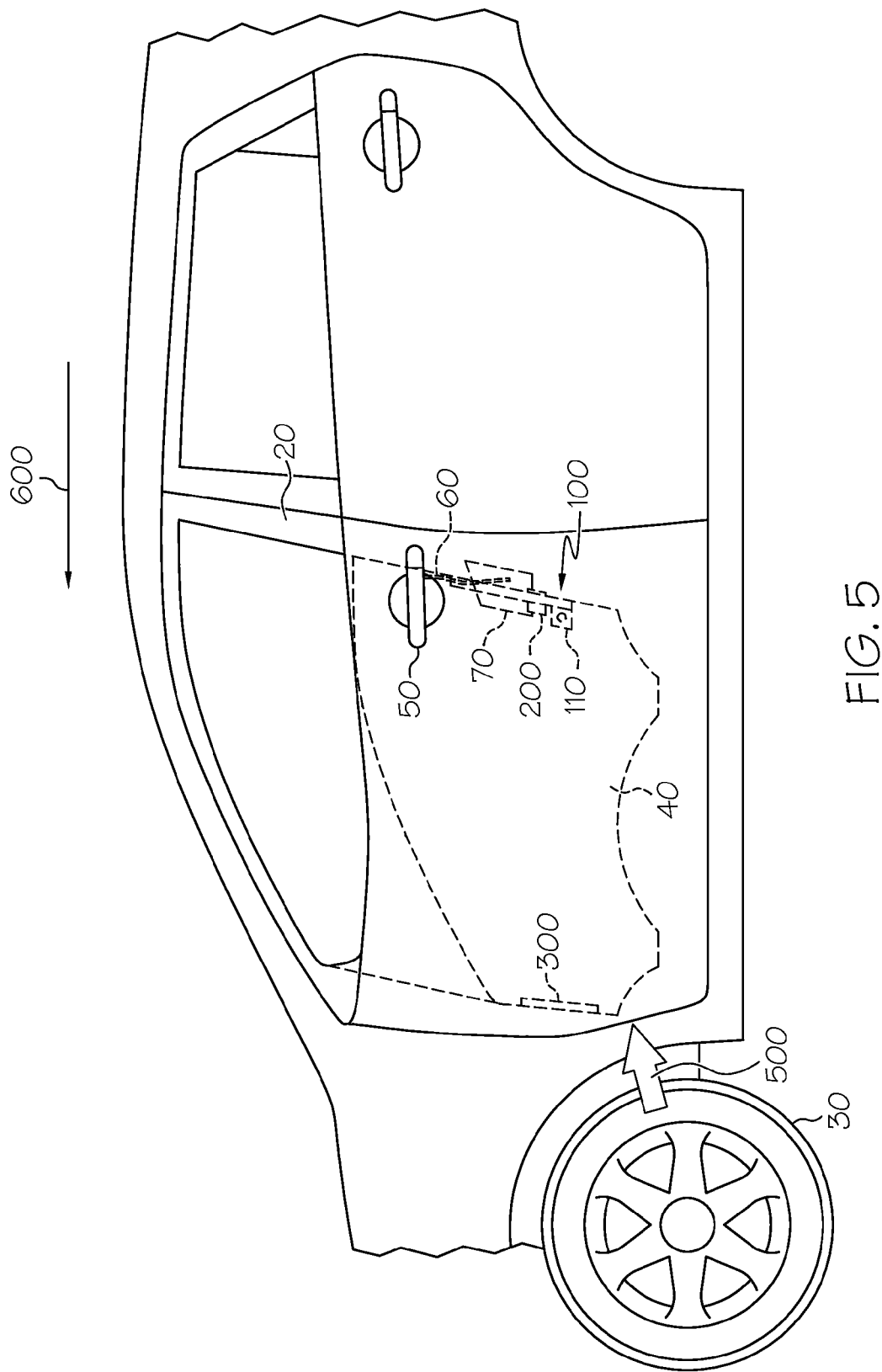
FIG. 5 depicts a side view of a vehicle including the front side door assembly and its internal components according to one or more embodiments shown and described herein.

FIG. 5 generally depicts a vehicle side door assembly including a side door lock assembly and a retractable side window assembly with a side window catch bracket that inhibits a dislodged side window from interfering with the lock rod of the side door lock assembly. The side door lock assembly may comprise an outside side door handle and a side door latch mechanically coupled by a lock rod. The lock rod may loosely slip into the side door latch and enable the side door latch to be opened from the outside side door handle. The retractable side window assembly may generally include front and rear edge side window guides which guide the side window. A side window catch bracket may extend from the rear edge side window guide and prevent the side window from contacting the lock rod if the side window is dislodged from the side window guide. The retractable side window assembly, the rear edge side window guide and the side window catch bracket will be discussed in more detail herein.

Figure 1:
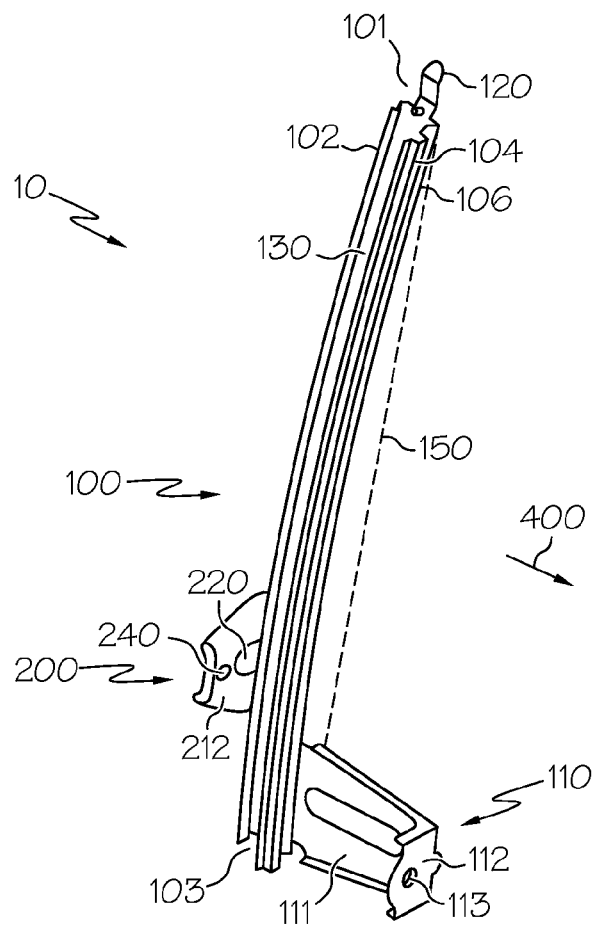
FIG. 1 depicts a rear edge side window catch assembly with upper and lower side door connections and a side window catch bracket according to one or more embodiments shown and described herein.
Figure 2:
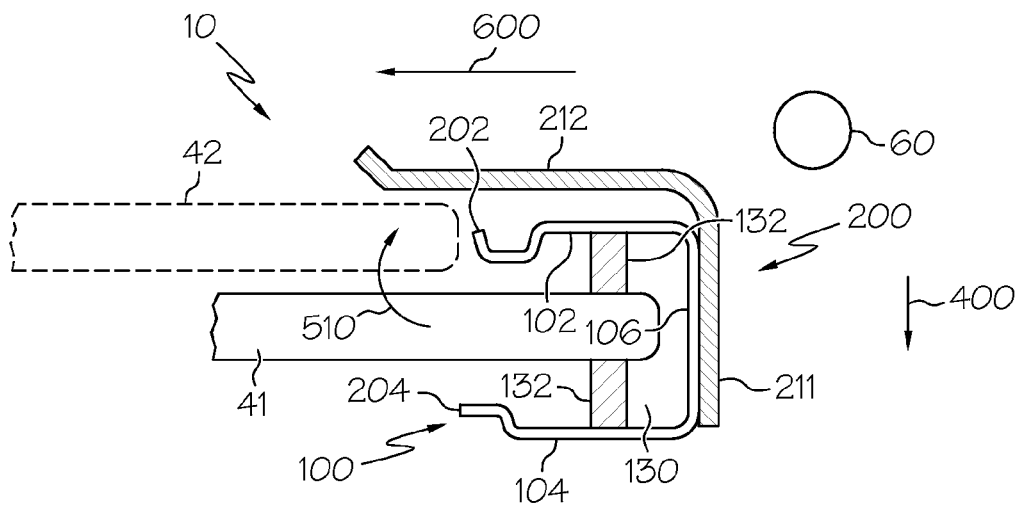
FIG. 2 depicts a cross section of a rear edge side window catch assembly with side window catch bracket adjacent a lock rod showing a possible dislodged side window location according to one or more embodiments shown and described herein.

Referring to FIG. 1 and FIG. 2, a rear edge side window catch assembly 10 for a vehicle comprises a rear edge side window guide 100 and a side window catch bracket 200. The rear edge side window guide 100 has an upper end 101 and a lower end 103 where the upper end is disposed above the lower end. A channel 130 may be substantially U-shaped and may be formed from an exterior side wall 102, an interior side wall 104 and a back wall 106 extending substantially the entire length between the first end and the second end of the rear edge side window guide 100. Exterior and interior as used herein refer to the position of a component relative to the direction of the inside of the vehicle 400. Accordingly an interior component will be proximate the inside of the vehicle and the exterior component will be proximate the outside of the vehicle. The exterior side wall 102 and interior side wall 104 may extend outward from opposite edges of the back wall 106 and may be substantially parallel to one another. In one embodiment, the side walls may be oriented such that the channel 130 is substantially U-shaped. In another embodiment, as seen in FIG. 2, exterior wall 102 and interior side wall 104 may comprise additional contours while the channel 130 remains generally U-shaped. In the alternative, the exterior side wall 102, interior side wall 104, or equivalents thereto, may otherwise deviate from a direction substantially perpendicular with the back wall 106 so that an alternatively shaped channel 130 may be formed (e.g. a substantially V-shaped guide or the like). As shown in FIG. 2, some embodiments of the rear edge side window guide 100 include an exterior forward-most portion 202 along the exterior side wall 102 and an interior forward-most portion 204 along the interior side wall 102. The exterior forward-most portion 202 and the interior forward-most portion 204 are positioned in the vehicle forward direction 600, as discussed below in regard to FIG. 5.

In one embodiment (not shown), the rear edge side window guide 100 may have a cylindrical channel with no clearly definable independent walls (such as when the channel 130 is substantially C-shaped). The channel may have an opening allowing access to the interior of the channel. In such an embodiment, the channel comprises one continuous wall. In the alternative, the channel may be formed by any other number of walls such that a side window positioned in the channel has lateral support relative to the interior and exterior sides of the side window.

In one embodiment, the exterior side wall 102, interior side wall 104 and back wall 106 are substantially solid for their entire length. In another embodiment, any individual wall, or a combination thereof, may contain gaps in the wall or be formed by intermittent or periodic slats (not shown).

The rear edge side window guide may extend in a substantially straight direction connecting the upper end 101 to the lower end 103. In the alternative, the rear edge side window guide may curve, bend, bow or otherwise deviate from a straight line 150 connecting the upper end 101 to the lower end 103 so that a middle portion of the rear edge side window guide is disposed away from the line 150 connecting the first end to the second end as shown in FIG. 1.

In one embodiment, the rear edge side window guide may have an upper side door connector proximate the upper end 101 and a lower side door connector proximate the lower end 103. These side door connectors may comprise tabs, brackets, holes or the like or a combination thereof. In one embodiment, the upper side door connector is a connector tab 120 proximate an upper end 101 and the lower side door connector is a connector bracket 110 proximate the lower end 103. The connector tab 120 generally extends away from the rear edge side window guide 100 and away from the channel 130. In an exemplary embodiment, the tab 120 extends from the back wall 106. The connector bracket 110 generally comprises an extension arm 111 and a connection arm 112. The connection bracket 110 connects to the rear edge side window guide 100 about a first end of the extension arm 111. The connection arm 112 connects to the extension arm 111 about a second end opposite the first end. The extension arm 111 may be connected to the back wall 106, or either the exterior side wall 102 or interior side wall 104. The connection arm 112 may contain an attachment location 113 that may comprise a hole or feature suitable for receiving a connector such as a bolt, screw, rivet or the like.

The rear edge side window guide 100 may be made from a variety of materials. In one embodiment, the rear edge side window guide may be a relatively flexible material that can twist or flex about its vertical axis but will remain static without the influence of an external force. For example, the rear edge side window guide may comprise a light weight metal or polymer-based material. In the alternative, the rear edge side window guide may comprise multiple materials at different locations depending on the specific application and requirements of the rear edge side window guide.

The channel 130 of the rear edge side window guide 100 may be lined with vibration dampening material 132. The lining may cover substantially all of the channel or just sections of the channel. In the alternative, the lining may extend out of the channel about the first end proximate the connector tab. In one exemplary embodiment, the lining may comprise rubber, felt or other pliable material capable of absorbing or dampening vibrations while securing the edge of a side window in the channel.

Referring to FIGS. 1 and 2, the side window catch bracket 200 of the rear edge side window catch assembly 10 comprises a connection section 211 and a catch section 212. In an exemplary embodiment, the connection section 211 is angled with respect to the catch section 212. This angle may vary depending on the configuration of the vehicle side window, but in an exemplary embodiment the angle may be about 90 degrees to form a substantially L-shaped structure. As depicted in FIG. 2, the catch section 212 of the side window catch bracket 200 extends from the catch section 212 such that at least a portion of the catch section 212 of the side window catch bracket 200 is positioned in the vehicle forward direction 600 from the exterior forward-most portion 202 and/or the interior forward-most portion 204 of the rear edge side window guide 100. In the alternative, the catch section 212 may extend in substantially the same direction as the connection section 211 (e.g. the angle between the catch section and the connection section is 180 degrees).

Figure 3:
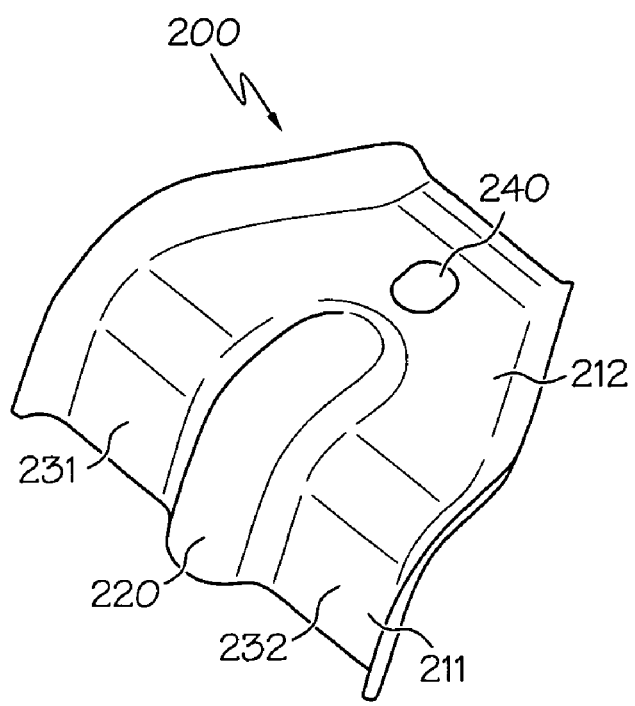
FIG. 3 depicts an exemplary side window catch bracket with a rigidity bead and datum hole according to one or more embodiments shown and described herein.
Figure 4:
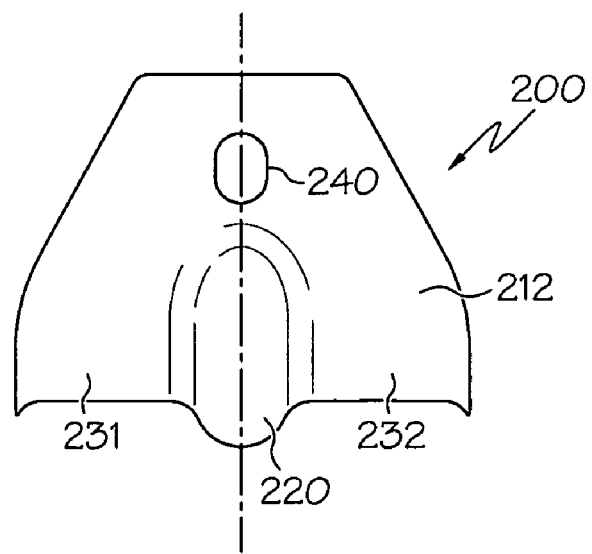
FIG. 4 depicts a top view of an exemplary side window catch bracket with a rigidity bead and datum hole according to one or more embodiments shown and described herein.

Referring to FIGS. 1, 3 and 4, in one exemplary embodiment the side window catch bracket 200 may include a rigidity bead 220 disposed along the center of the connection section 211 and further extending onto the catch section 212. The rigidity bead may improve the overall rigidity of the bracket. Accordingly, by adding a semi-spherical ridge, or alternative contours, to the center, the side window catch bracket may resist greater force from a frontal impact collision without deforming. In the alternative, the rigidity bead 220 may be disposed in various other locations about the side window catch bracket 200. For example, the rigidity bead 220 may be entirely disposed on the connection section 211 or the catch section 212. Or, the rigidity mead may be disposed at a location not about the center of the side window catch bracket 200.

Likewise, the rigidity bead may comprise a dart or wedge. Similarly, the edges of the side window catch bracket may be raised or bent so that they may resist a force exerted on the catch section 212.

Referring now to FIG. 4, the exemplary side window catch bracket 200 of FIG. 4 is shown from a top view. The side window catch bracket may further include a datum hole 240 located in the catch portion 212. The datum hole 240 is a reference that may aid in manufacturing and assembly of the side window catch bracket and rear edge side window guide by providing a reference location or grip during alignment of the parts.

While embodiments of the side window catch bracket 200 are shown herein as comprising a datum hole 240 and a rigidity bead 220, it should be understood that other embodiments (not shown) of the side window catch bracket may comprise either a datum hole 240 or a rigidity bead 220 while still other embodiments (not shown) of the side window catch bracket will not comprise either a datum hole 240 or a rigidity bead 220.

The side window catch bracket may be made of a variety of materials. However, it may be desirable for the side window catch bracket to be a more rigid material than the rear edge side window guide. A mild steel, for example grade 270, has sufficient rigidity to prevent the bracket from substantially deforming during most impacts. However, alternative metals, alloys, hard plastics and other materials may be used. Alternatively, a combination of different materials such as metals, polymers and composites may be employed.

Referring to FIG. 1 and FIG. 2, the side window catch bracket 200 may be connected to the rear edge side window guide 100. In one exemplary embodiment, the side window catch bracket 200 is disposed on the rear edge side window guide 100 such that the connection section 211 contacts the back wall 106 of the rear edge side window guide 100. The catch section 212 extends outward from the rear edge side window guide 100 along the exterior side wall 102. The connection section 211 may extend along the back wall 106 and beyond the exterior side wall 102 such that a gap exists between the catch section 212 and the exterior side wall 102.

In the alternative, the side window catch bracket 200 may connect elsewhere along the rear edge side window guide 100. In one embodiment, the connection section 211 may connect to the exterior side wall 102 and the catch section 212 may extend from the connection section 211 without any angular deviation. In another embodiment, the connection section may be integral with the back wall 106 or exterior side wall 102 making the connection seamless (e.g. the angle between the catch section 212 and connector section 211 is 180 degrees).

As further seen in the exemplary embodiment in FIG. 1, the side window catch bracket 200 may be disposed closer to the connector bracket 110 than the connector tab 120. This provides a vertical distance separating the connector tab from the side window catch bracket. In general, the side window catch bracket 200 is positioned on the rear edge side window guide 100 to avoid interference with the functional components of the door (e.g., the lock rod (not shown), the side door latch (not shown), and/or other components housed therein).

Various attachment methods may be used to attach the side window catch bracket to the rear edge side window guide. In one embodiment, as seen in FIG. 3 and FIG. 4, a first spot weld 231 and second spot weld 232 may secure the connection section 211 to the rear edge side window guide (not shown). The spot welds may be disposed a distance apart to help distribute potential forces imposed upon the side window catch bracket. For example, the weld locations 231 and 232 may be positioned on either side of the rigidity bead 220. In the alternative, the connection may comprise a single weld or multiple welds in various locations. In another embodiment, other attachment methods may be used such as, but not limited to, bolts, screws, adhesives or the like.

Referring now to FIG. 2, a cross section of a rear edge side window catch assembly 10 with a rear edge side window guide 100 with side window catch bracket 200 is shown adjacent to a lock rod 60. In normal operation, the side window 41 rests within the channel 130. The channel 130 may be wider than the side window 41 allowing for some space between the channel and the side window. Lining material (not shown) may be disposed between the side window 41 and the channel 130 to secure the side window in the channel and reduce vibration and noise. In some embodiments, a rubber side window run, or the rubber interior to the rear edge side window guide, may extend past the rear edge side window guide.

Referring to FIGS. 1, 2 and 5, an exemplary rear edge side window catch assembly 10 is shown with side door connection means 110 and 120 and side window catch bracket 200. The channel 130 extends in a substantially vertical direction relative to the side door assembly 20 to guide the side window 41 as it is raised or lowered.

In one exemplary embodiment, the rear edge side window catch assembly 10 is connected to the side door assembly 20 with an upper connector portion proximate the upper end 101 and lower connector portion proximate the lower end 103. The upper connector portion may be in the form of a tab connector 120 while the lower side door connection may be in the form of a bracket connector 110. The tab connector 120 connects with the vehicle side door proximate where a fully retracted side window exits the vehicle side door interior. This connection may comprise a rivet, bolt or weld between the connector tab and the vehicle side door, a snap-fit interaction, a slot/tab connection or the like. The connector bracket 110 connects with the vehicle side door proximate the bottom of the vehicle side door and is secured to the vehicle side door assembly 20 with a threaded connector extending through the hole 113 of the connector bracket 110.

Referring to FIG. 5, the side window 40 is capable of retracting into the side door assembly 20 along a front edge side window guide 300 and rear edge side window guide 100. As used herein, the terms "front" and "rear" refer to relative positions in the vehicle with respect to the vehicle forward direction 600. As such, "front" refers to positions towards the forward direction of travel of the vehicle and "rear" refers to positions away from the forward direction of travel of the vehicle. Consistent with this definition, the front edge side window guide 300 is positioned in the vehicle forward direction 600 from the rear edge side window guide 100. The front edge side window guide 300 may have a channel similar to the rear edge side window guide but facing in the opposite direction so that the opening of the front edge side window guide

300 faces the opening of the rear edge side window guide. An operator may either electrically or mechanically raise or lower the side window depending on their needs. This may be accomplished through a mechanical or electromechanical actuator (not shown) mechanically coupled to the side window and operated by a mechanical lever (e.g. a crank) or electrical switch. The side door assembly 20 may further include an outside door handle 50 mechanically coupled to a side door latch 70 by a lock rod 60. The side door latch 70 may be actuated from the outside door handle 50 by pulling or raising the outside door handle 50. The motion of the outside door handle 50 may be transmitted to the side door latch by the lock rod 60 thereby opening the side door latch.

The side door latch 70 is generally disposed below the outside door handle 50 but above the bottom of the side door. A retracted side window 40 and its rear edge side window guide 100 extend below the lock rod 60 within side door assembly 20. Specifically, the side window catch bracket 200 is attached to the rear edge side window guide 100 in a location below the lock rod 60. The connection between the side door latch 70 and the lock rod 60 is often a loose connection subjecting the lock rod to potential unintended disengagement if interfered with. While the specific dynamics of a lock rod based side door lock assembly may vary by vehicle model, the guiding principle is nonetheless applicable to alternative embodiments.

Referring to FIG. 5, when a front wheel assembly 30 moves in a direction 500 toward the side door assembly 20 with significant force, it may collide with the side door assembly 20. It should be understood that a collision is not limited to the front wheel assembly and other vehicle components or external objects may similarly move in the direction 500 toward the front door assembly 20. Such a collision may result in the side window 41 disengaging from the rear edge side window guide 100 as shown in FIG. 2 (e.g., when dislodged side window 42 is moved in a direction 510 towards the interior of the vehicle and outside the channel 130 of the rear edge side window guide 100). A side window may become dislodged when the side window is fully retracted or when a side window is only partially retracted into the side door assembly 20. When the side window 41 dislodges from the rear edge side window guide 100, the side window catch bracket 200 catches the dislodged side window 42 and prevents the side window from colliding with lock rod 60 thereby preserving the functionality of the side door lock mechanism.

In addition, since the rear edge side window guide 100 is often a relatively flexible structure, it may have a tendency to twist upon frontal impact. As the side window catch bracket 200 is attached to the rear edge side window guide 100, the side window catch bracket 200 may inherently rotate as well. If the side window catch bracket 200 is positioned on the rear edge side window guide 100 at a similar height as the lock rod 60, the side window catch bracket 200 may itself rotate and collide into the lock rod 60 inhibiting functionality of the side door 20. Therefore, it is desirable to connect the side window catch bracket 200 to the rear edge side window guide 100 at a location on the rear edge side window guide 100 such that the side window catch bracket 200 will not interfere with the lock rod 60. In the embodiments shown herein, interference with the lock rod 60 is avoided by positioning the side window catch bracket 200 below the lock rod 60. This allows clearance for the side window catch bracket 200 to rotate in a direction toward the lock rod 60 without actual collision while still catching the dislodged side window 42.

The side window catch bracket should therefore be connected to the rear edge side window guide at a location that provides sufficient vertical clearance between the side window catch bracket and the lock rod while maintaining its effectiveness in catching a dislodged retracted side window in the event of frontal impact. While specific embodiments of the rear edge side window catch assembly are shown in conjunction with a driver's side door of a vehicle, it should be understood that similarly configured rear edge side window catch assemblies may be used in conjunction with a passenger's side door.

It should now be understood that the rear edge side window catch assembly may be used to prevent a dislodged side window from, among other things, contacting and disrupting a lock rod thereby preserving the operation of the vehicle outside door handle and side door latch following a collision.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A rear edge side window catch assembly for a vehicle side window comprises a rear edge side window guide and a side window catch bracket, wherein:
   the rear edge side window guide comprises an upper end, a lower end and a substantially U-shaped channel having an open end and formed by an exterior side wall and an interior side wall connected by a back wall, the channel extending substantially an entire length between the upper end and the lower end; and
   the side window catch bracket comprises a connection section and a catch section, wherein the connection section is connected to the rear edge side window guide and the catch section extends from the rear edge side window guide along the exterior side wall in a direction towards an opening of the channel to a position past the rear edge side window guide in a direction extending past the open end of the U-shaped channel to a position past the rear edge side window guide in a vehicle forward direction, wherein when the rear edge side window catch assembly is installed into a vehicle side door assembly, the entirety of the side window catch bracket is spaced apart vertically from the entirety of a lock rod such that the entirety of the side window catch bracket is entirely located at a vertical height lower than the lock rod, wherein the lock rod is coupled to a side door latch and an outside door handle of the vehicle side door assembly.

2. The rear edge side window catch assembly of claim 1, wherein the catch section extends in an direction substantially parallel to the exterior side wall and the interior side wall.

3. The rear edge side window catch assembly of claim 1 wherein the catch section extends outward in a direction substantially parallel to the vehicle side window when the vehicle side window is disposed in the channel.

4. The rear edge side window catch assembly of claim 3 wherein the side window catch bracket is substantially L-shaped.

5. The rear edge side window catch assembly of claim 4 wherein the connection section is connected to an outside of the back wall of the channel.

6. The rear edge side window catch assembly of claim 1 wherein the catch section comprises a rigidity bead.

7. The rear edge side window catch assembly of claim 1 wherein the rear edge side window guide has an upper side door connector proximate the upper end and a lower side door connector proximate the lower end.

8. The rear edge side window catch assembly of claim 7 wherein the side window catch bracket is steel.

9. A rear edge side window catch assembly for a vehicle side window comprising a rear edge side window guide and a side window catch bracket wherein:
the rear edge side window guide comprises a connector tab extending from an upper end, a connector bracket extending from a lower end and a substantially U-shaped channel having an open end and formed by an exterior side wall and an interior side wall connected by a back wall, the channel extending substantially an entire length between the connector tab and the connector bracket; and
the side window catch bracket comprises a connection section and a catch section, wherein the connection section is connected to an outside surface of the back wall and the catch section extends outward from the rear edge side window guide to a position past the rear edge side window guide in a direction extending past the open end of the U-shaped channel to a position past the rear edge side window guide in a vehicle forward direction,
wherein when the rear edge side window catch assembly is installed into a vehicle side door assembly, the entirety of the side window catch bracket is spaced apart vertically from the entirety of a lock rod such that the entirety of the side window catch bracket is entirely located at a vertical height lower than the lock rod, wherein the lock rod is coupled to a side door latch and an outside door handle of the vehicle side door assembly.

10. The rear edge side window catch assembly of claim 9 wherein the catch section is angled with respect to the connection section.

11. The rear edge side window catch assembly of claim 10 wherein an angle between the catch section and the connection section is about 90 degrees.

12. The rear edge side window catch assembly of claim 10 wherein the connector bracket comprises a hole for receiving a connector.

13. The rear edge side window catch assembly of claim 9 wherein the channel is lined with a vibration dampening material.

14. The rear edge side window catch assembly of claim 9 wherein the side window catch bracket further comprises a rigidity bead disposed about the connection section and the catch section.

15. The rear edge side window catch assembly of claim 9 wherein the connection section is welded to the back wall of the channel.

16. The rear edge side window catch assembly of claim 15 wherein the catch section extends past the exterior side wall.

17. A vehicle side door assembly having a lock rod couple to a side door latch and an outside door handle of the vehicle side door assembly and a side window assembly comprising a side window, a front edge side window guide, a rear edge side window guide and a side window catch bracket, wherein:
the front edge side window guide comprises a front edge side window channel with a rear-facing opening;
the rear edge side window guide comprises an exterior side wall and an interior side wall connected by a back wall forming a rear edge side window channel with a front-facing opening, the front-facing opening substantially facing the rear-facing opening, where the side window is disposed between the front edge side window channel and the rear edge side window channel; and
the entirety of the side window catch bracket is spaced apart vertically from the entirety of the lock rod such that the entirety of the side window catch bracket is entirely located at a vertical height lower than the entirety of the lock rod; wherein the side window catch bracket comprises a connection section connected to the rear edge side window guide and the side window catch bracket extends to a position past the rear edge side window guide and past the front-facing opening of the rear edge side window channel and a catch section along the exterior side wall that extends substantially towards the front edge side window guide, and the side window catch bracket extends in a vehicle forward direction to a position past the rear edge side window guide.

18. The vehicle side door assembly of claim 17 wherein the side window catch bracket comprises a rigidity bead.

19. The vehicle side door assembly of claim 17 wherein the front edge side window channel and the rear edge side window channel are lined with a vibration dampening material.

20. The vehicle side door assembly of claim 17 wherein the connection section is welded to the rear edge side window guide.

\* \* \* \* \*